(12) United States Patent
Karaje et al.

(10) Patent No.: US 9,600,337 B2
(45) Date of Patent: Mar. 21, 2017

(54) CONGESTION AVOIDANCE IN NETWORK STORAGE DEVICE USING DYNAMIC WEIGHTS

(71) Applicant: Nimble Storage, Inc., San Jose, CA (US)

(72) Inventors: Gurunatha Karaje, San Jose, CA (US); Tomasz Barszczak, San Jose, CA (US); Vanco Buca, San Jose, CA (US); Ajay Gulati, San Jose, CA (US); Umesh Maheshwari, San Jose, CA (US)

(73) Assignee: Nimble Storage, Inc., San Jose, CA (US)

( * ) Notice: Subject to any disclaimer, the term of this patent is extended or adjusted under 35 U.S.C. 154(b) by 0 days.

(21) Appl. No.: 14/927,868

(22) Filed: Oct. 30, 2015

(65) Prior Publication Data
US 2016/0092272 A1  Mar. 31, 2016

Related U.S. Application Data

(63) Continuation-in-part of application No. 14/748,179, filed on Jun. 23, 2015, now Pat. No. 9,483,187.

(60) Provisional application No. 62/058,015, filed on Sep. 30, 2014.

(51) Int. Cl.
*G06F 9/46* (2006.01)
*G06F 9/50* (2006.01)
*G06F 13/16* (2006.01)

(52) U.S. Cl.
CPC ........ *G06F 9/5011* (2013.01); *G06F 13/1642* (2013.01); *G06F 9/5027* (2013.01); *G06F 9/5038* (2013.01)

(58) Field of Classification Search
CPC .. G06F 9/5011; G06F 13/1642; G06F 9/5027; G06F 9/5038
See application file for complete search history.

(56) References Cited

U.S. PATENT DOCUMENTS

| | | | |
|---|---|---|---|
| 2016/0021172 A1* | 1/2016 | Mahadevan | G06F 17/30598 709/204 |
| 2016/0044126 A1* | 2/2016 | Mahadevan | H04L 67/2842 709/213 |

* cited by examiner

*Primary Examiner* — Camquy Truong
(74) *Attorney, Agent, or Firm* — Martine Penilla Group, LLP

(57) ABSTRACT

Methods, systems, and computer programs are presented for allocating CPU cycles and disk Input/Output's (IOs) to resource-creating processes based on dynamic weights that change according to the current percentage of resource utilization in the storage device. One method includes operations for assigning a first weight to a processing task that increases resource utilization of a resource for processing incoming input/output (IO) requests, and for assigning a second weight to a generating task that decreases the resource utilization of the resource. Further, the method includes an operation for dynamically adjusting the second weight based on the current resource utilization in the storage system. Additionally, the method includes an operation for allocating the CPU cycles and disk IOs to the processing task and to the generating task based on their respective first weight and second weight.

21 Claims, 11 Drawing Sheets

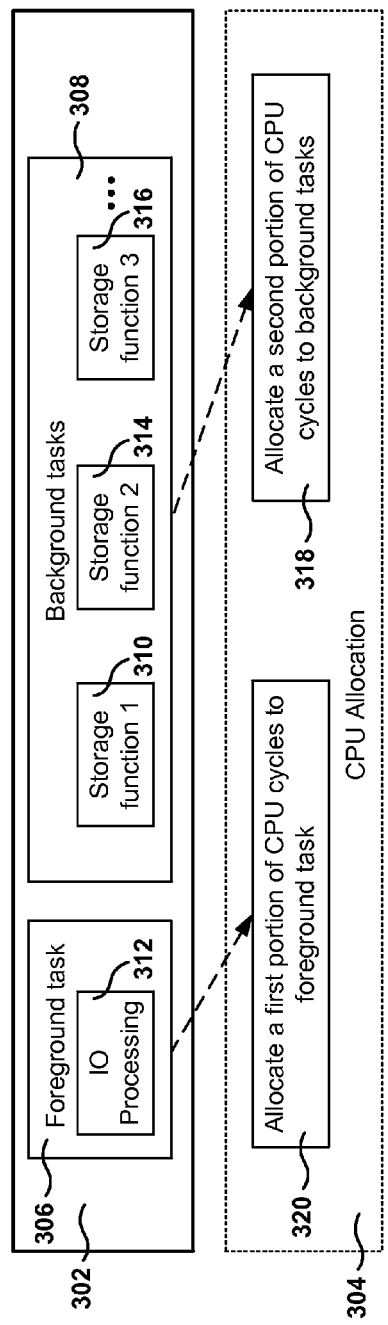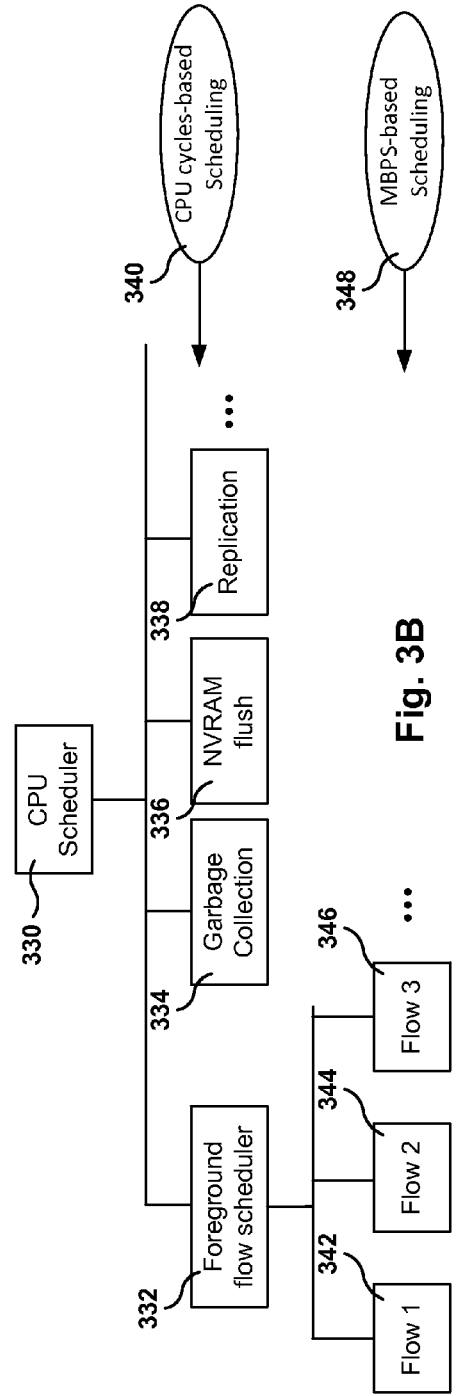

CONGESTION AVOIDANCE IN NETWORK STORAGE DEVICE USING DYNAMIC WEIGHTS

CLAIM OF PRIORITY

This application is a Continuation-in-part Application of U.S. patent application Ser. No. 14/748,179, entitled "Quality of Service Implementation in a Networked Storage System with Hierarchical Schedulers," filed on Jun. 23, 2015, which claims priority from U.S. Provisional Patent Application No. 62/058,015, filed Sep. 30, 2014, and entitled "Quality of Service Implementation in a Networked Storage System with Hierarchical Schedulers," all of which are herein incorporated by reference.

BACKGROUND

1. Field of the Invention

The present embodiments relates to methods, systems, and programs for allocating resources in a networked storage system, and more particularly, methods, systems, and computer programs for allocating CPU cycles and disk IOs to resource-freeing processes based on dynamic priorities.

2. Description of the Related Art

Network storage, also referred to as network storage systems or storage systems, is computer data storage connected to a computer network providing data access to heterogeneous clients. Typically network storage systems process a large amount of Input/Output (IO) requests, and high availability, speed, and reliability are desirable characteristics of network storage. In addition to processing read and write IO requests, network storage systems need to perform other background operations required for maintaining these systems, such as garbage collection of obsolete data and compaction of data (e.g., merging contents of two half-filled segments into one full segment), creating snapshots of data, backup and replication procedures, etc.

However, if a network storage device spends most of its time processing read and write IOs, the background operations may not run efficiently, which in the long run will affect the performance and reliability of a network storage device. On the other hand, if background operations consume too many processing resources (e.g., CPU cycles, disk IOs) of the storage system, read and write IO performance will be degraded.

What is needed is a network storage device, software, and systems that provide for fair utilization of system resources to enable a storage system to process IOs with high performance, while reserving enough resources to perform background operations required for the ongoing operation of the network storage device.

SUMMARY

Methods, devices, systems, and computer programs are presented for allocating CPU cycles and disk IOs to resource-creating processes based on dynamic priorities that change according to the current percentage of resource utilization in the storage device. It should be appreciated that the present embodiments can be implemented in numerous ways, such as a method, an apparatus, a system, a device, or a computer program on a computer readable medium. Several embodiments are described below.

In one embodiment, a method for allocating CPU cycles and disk IOs (central processing unit) of a storage system is provided. The method includes operations for assigning a first weight to a processing task that increases resource utilization of a resource for processing incoming input/output (IO) requests, and for assigning a second weight to a generating task that decreases the resource utilization of the resource. Further, the method includes an operation for dynamically adjusting the second weight based on the current resource utilization in the storage system. When the current resource utilization in the storage system is less than a first predetermined threshold, the second weight has a first value. When the current resource utilization in the storage system is greater than a second predetermined threshold, which is greater than the first predetermined threshold, the second weight has a second value that is greater than the first value. When the current resource utilization in the storage system is between the first predetermined threshold and the second predetermined threshold, the second weight has a variable value between the first value and the second value, where the variable value grows as the current resource utilization grows. Further, the method includes an operation for allocating the CPU cycles and disk IOs to the processing task and to the generating task based on their respective first weight and second weight.

In another embodiment, a storage system includes a non-volatile memory (NVRAM) for storing incoming input/output (IO) requests, a hard drive (HDD) for permanent data storage, and a central processing unit (CPU). A processing task and a generating task are executed by the CPU, the processing task increasing resource utilization of a resource for processing incoming input/output (IO) requests, and the generating task decreasing the resource utilization of the resource. A CPU scheduler and a disk scheduler assign a first weight to the processing task and a second weight to the generating task. The CPU scheduler and the disk scheduler dynamically adjust the second weight based on the current resource utilization in the storage system. When the current resource utilization in the storage system is less than a first predetermined threshold, the second weight has a first value. When the current resource utilization in the storage system is greater than a second predetermined threshold, which is greater than the first predetermined threshold, the second weight has a second value that is greater than the first value. When the current resource utilization in the storage system is between the first predetermined threshold and the second predetermined threshold, the second weight has a variable value between the first value and the second value, where the variable value grows as the current resource utilization grows. Further, the CPU scheduler and the disk scheduler allocate CPU cycles and disk IOs to the processing task and to the generating task based on their respective first weight and second weight.

In yet another embodiment, a non-transitory computer-readable storage medium storing a computer program for allocating CPU (central processing unit) cycles and disk IOs of a storage system is provided. In one embodiment, the computer program allocates IOs to multiple disk drives. Further, the computer-readable storage medium includes program instructions for assigning a first weight to a processing task that increases resource utilization of a resource for processing incoming input/output (IO) requests. The storage medium further includes program instructions for assigning a second weight to a generating task that decreases the resource utilization of the resource, and program instructions for dynamically adjusting the second weight based on the current resource utilization in the storage system. When the current resource utilization in the storage system is less than a first predetermined threshold, the second weight has a first value. When the current resource utilization in the storage system is greater than a second predetermined threshold, which is greater than the first predetermined threshold, the second weight has a second value that is greater than the first value. When the current resource utilization in the storage system is between the first predetermined threshold and the second predetermined threshold, the second weight has a variable value between the first value and the second value, where the variable value grows as the current resource utilization grows. Further, the storage medium includes program instructions for allocating the CPU cycles and the disk IOs to the processing task and to the generating task based on their respective first weight and second weight.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

FIG. 3A is a high level diagram of the hierarchical CPU scheduler according to one embodiment.

FIG. 3B is a detailed CPU scheduling hierarchy, according to one embodiment.

DETAILED DESCRIPTION

The following embodiments describe methods, devices, systems, and computer programs for allocating CPU cycles and disk IOs to resource-creating processes based on dynamic resource allocations, which are implement using dynamic weights, which change according to the current percentage of resource utilization in the storage device. It is in this context that embodiments arise.

As the system processes incoming Input/Output (IO) requests, the consumption of resources (e.g., NVRAM—Non-Volatile Random Access Memory—data pages, disk space) increases. Background tasks, also referred to herein as resource generators (e.g. NVRAM drainer, Garbage Collector, Index merge, etc.), process these consumed resources and release them back to the pool to decrease the resource utilization level. However, background tasks need CPU cycles and disk IOs to release these resources. But sometimes a constant flow of incoming IOs puts strain on the system, and the background tasks that release resources may not get enough CPU cycles and/or disk IOs to effectively release these resources being consumed.

In some solutions, processing of incoming IOs is throttled so background tasks that release resources get enough CPU cycles and/or disk IOs. But throttling of IO processing has shortcomings, such as being activated too late when the system is already under stress, or causing the IO average completion rate to decrease substantially when the system is congested.

Embodiments presented herein utilize what is called dynamic weight adjustment for prioritizing processes that free resources, which adjusts the scheduling priority for CPU and disk access. When resource utilization levels (such as utilization of NVRAM data pages, disk space) reach a threshold, an adjustment is made to the weight used for prioritizing execution of background tasks that release resources back to the free pool. By adjusting the CPU and disk scheduler weights, CPU cycles and disk IO allocation can be varied for background tasks. When CPU cycles and disk IO allocation is increased, these tasks can work aggressively to release resources back to the free pool.

It will be apparent, that the present embodiments may be practiced without some or all of these specific details. In other instances, well-known process operations have not been described in detail in order not to unnecessarily obscure the present embodiments.

Figure 1:
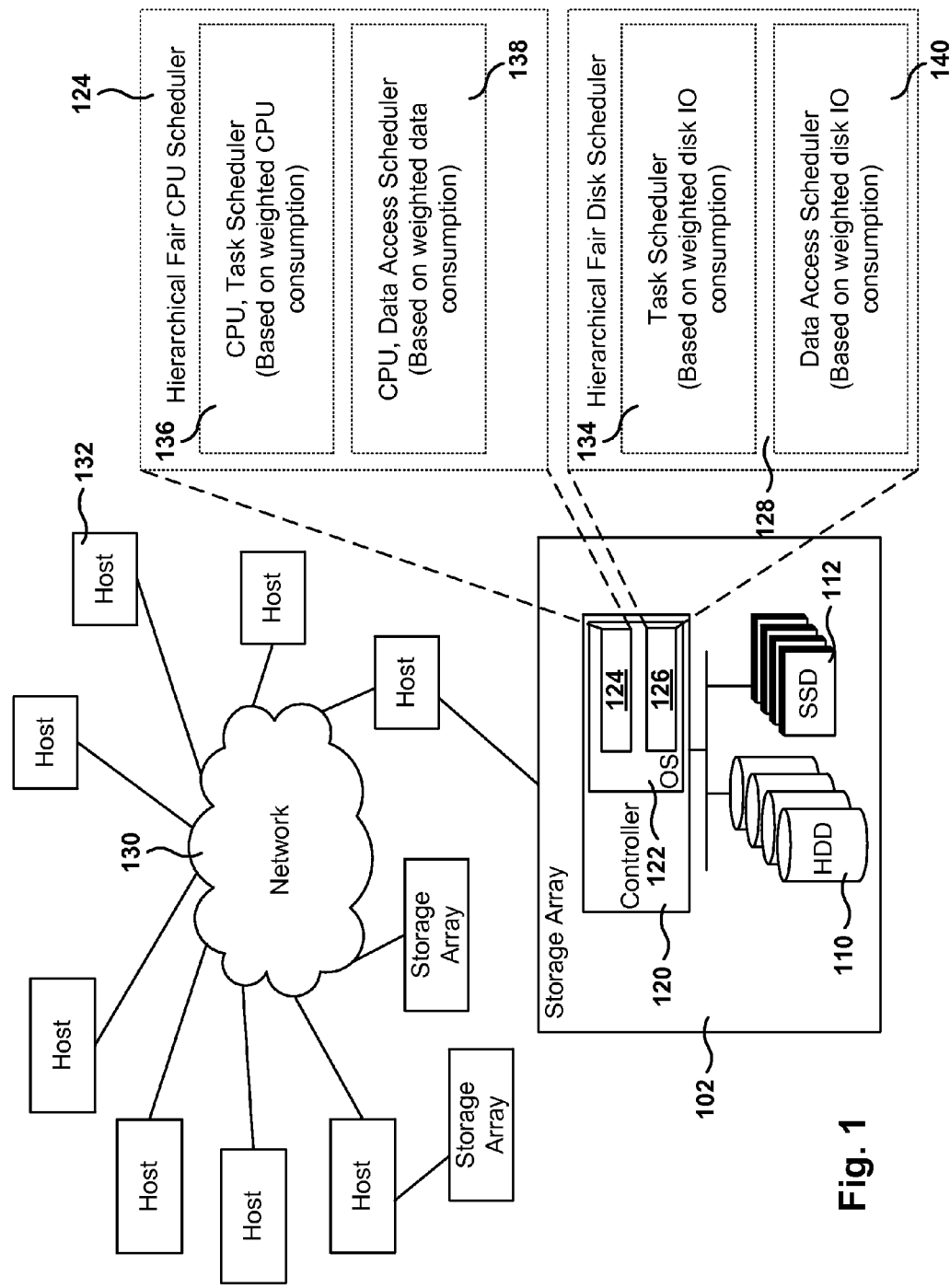
FIG. 1 depicts a system with network storage, according to one embodiment.

FIG. 1 depicts a system with network storage, according to one embodiment. The networked storage device, also referred to herein as a storage array 102 or a storage system, includes a controller 120 with a storage operating system 122, which is a multitasking system able to execute several tasks concurrently. One or more tasks process IO requests, and these tasks that process IOs are referred to herein as foreground tasks. Further, the amount of work involved in processing IO requests belonging to an application is referred to herein as a workload. Background tasks are tasks that do not cause a host initiator to wait for their output. For example, background tasks may include system maintenance tasks, such as processing an alert when a resource consumption reaches a threshold, taking a scheduled snapshot, garbage collection (GC), etc. These foreground and background tasks contend for shared resources, such as CPU, disk, and flash memory.

For example, migration of a virtual machine (VM) is an operation that usually requires heavy utilization of resources. If VM migration is given all the bandwidth possible, then other applications dependent on IO requests (e.g., such as remote video displays, database requests, video, streaming, etc.) may experience unsatisfactory performance or visible/noticeable degradation. It is noted that VM migration, as well as some other applications, are foreground workloads processed by the foreground task.

In the example architecture of FIG. 1, one or more storage arrays 102 provide storage services to one or more servers 126, 128 (which are referred to herein as hosts) and to one or more clients 132. The configuration depends on the implementation of the storage array and the demand by application. Network 130 provides transport for the data exchanges between the storage array 102 and servers 126, 128 or clients 132. In addition, server 126 may be directly connected to a storage array without communicating through network 130. Storage array 102 includes one or more controllers 120, one or more hard disk drives (HDD) 110, and one or more solid state drives (SSD) 112, also referred to herein as flash cache. Additional examples regarding the system are provided below. In one embodiment, the storage operating system 122 executing in the controller includes a quality of service (QOS) manager 124 for implementing fair scheduling in the storage array 102.

In one embodiment, the Hierarchical Fair CPU Scheduler (HFCS) manager 124 includes at least two CPU schedulers: a task scheduler 136 and a data-access scheduler 138. The data-access scheduler 138 schedules IO requests generated by and for the foreground workloads. The task scheduler 136 allocates the use of the CPU to the different tasks, foreground or background, based on the amount of CPU cycles (or any other metric related to CPU consumption utilized by the different tasks). Additionally, the data-access scheduler 138 allocates the IO resources to the different applications accessing the storage array based data processed (e.g., for example purposes only, based on the megabits per second (MBPS) consumed by the different applications, or based on the megabits consumed by the different applications, or throughput, or amount of data processed).

As used herein, the use of the two types of schedulers for allocating resources in the storage system is referred to as a dual-currency system, because two different types of metrics are utilized for the allocation of resources. It is noted that there can be also other types of schedulers in the system that utilize different scheduling criteria, such as first come first serve (FCFS). Furthermore, there may be additional schedulers that add additional levels of currency, for additional control and handling of storage system QoS demands, or use a single currency.

Controller 120 further includes a Hierarchical Fair Disk Scheduler 128. Similar to the HFCS 124, Hierarchical Fair Disk Scheduler (HFDS) 128 includes at least two disk schedulers: task scheduler 134 and data-access scheduler 140. The data-access scheduler 140 schedules IO requests generated by and for the foreground workloads, and the task scheduler 134 allocates disk IOs to the different tasks, foreground or background, based on the consumption of disk IOs by these tasks. Some embodiments are described with reference to the CPU scheduler but the same principles may be applied to a hierarchical disk scheduler. For example, in one embodiment the disk scheduler utilizes a single currency system for scheduling disk IOs based on the amount of disk IO consumed by each task. In another embodiment, the disk scheduler uses a two currency system, similar to the CPU scheduler.

Figure 2A:
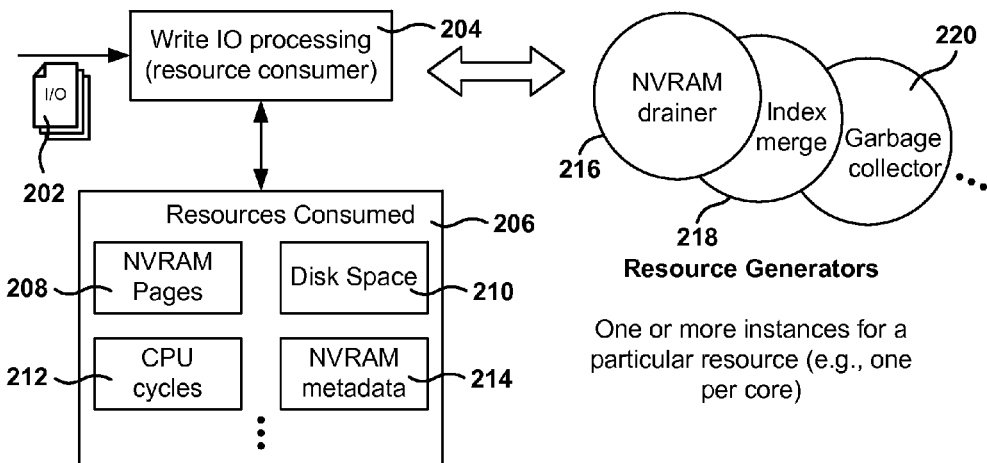
FIG. 2A illustrates the use of resources in the network storage device, according to one embodiment.

FIG. 2A illustrates the use of resources in the network storage device, according to one embodiment. Write IOs 202 come into the storage device, and the write IOs 202 consume resources 206 to be processed. The resources consumed include one or more of NVRAM pages 208, disk space 210, CPU cycles 212, NVRAM metadata 214, etc.

It can be said that the write IOs 202 are resource consumers, because the write IOs consume resources to be processed. On the other hand, there are processes in the system, also referred to herein as resource generators or generating tasks, that when executed free the resources consumed by the write IOs 202. For example, the resource generators include NVRAM drainer 216, also referred to herein as NVRAM flush, disk space manager 218, CPU scheduler 220, etc. It is noted that there could be one or more instances of a resource generator process executing simultaneously in the storage device. For example, in a storage device with multiple CPU cores, there could be at any given time a different resource generator process executing in each CPU core. Further, in some disk systems, there is a hierarchical fair disk scheduler for a group of disks—called RAID group. In each disk system, there can be several RAID groups—one per shelf of disks. Thus, different resource generators may be consuming disk IOs in each RAID group.

One method to manage congestion is to throttle incoming IOs. This way, resources are not exhausted in the system. Throttling IOs gives more time to the background tasks (e.g., NVRAM drainer) to free resources faster.

When the system is congested and being under pressure for CPU resources or disk-access resources, the fair schedulers aim at providing a fair allocation of CPU cycles and disk IOs. However, if the system gets into IO throttle mode for lack of one or more resources, then the fair schedulers cannot guarantee fairness. Lack of fairness may be because the decision to throttle IOs is made before submitting the IO for CPU and/or disk scheduling. As a result, fair schedulers do not take into consideration the queue build up, resulting in lack of fairness.

Figure 2B:
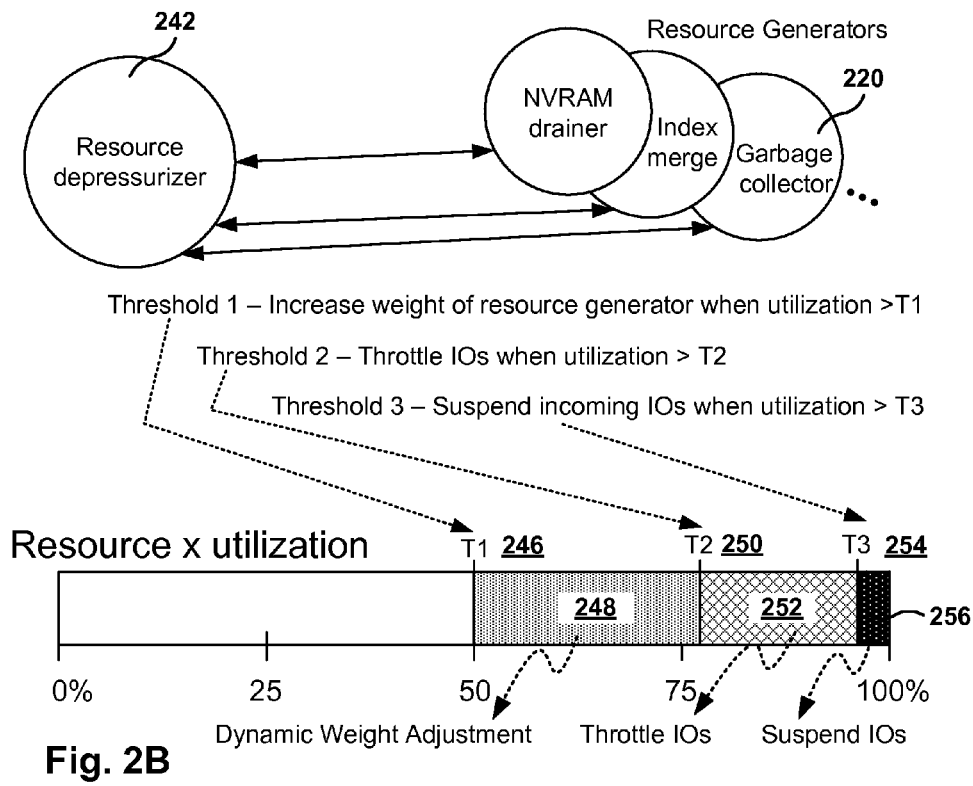
FIG. 2B illustrates the assignment of thresholds for managing a location of resources, according to one embodiment.

FIG. 2B illustrates the assignment of thresholds for managing a location of resources, according to one embodiment. In one embodiment, a resource depressurizer 242 engages the resource generators when the resource utilization rises to a predetermined level, such as NVRAM drainer 216.

For each resource, a resource utilization ratio 244 is monitored, where the resource utilization ratio 244 identifies the percentage of the total amount of resource available that is currently in use. This means that the resource utilization ratio is measured as a percentage value that goes from 0% (when no resource is being utilized) to 100% (when all the resource has been consumed, i.e., no resource is currently available).

Initially, when the system boots up, the resource utilization is 0% and gradually starts increasing as more of the resource is used. The system defines different behaviors depending on the current value of the resource utilization ratio 244. In one embodiment, one or more thresholds for the resource utilization ratio 244 are defined, and the scheduling of generating tasks depends on the values of the thresholds. In one embodiment, the different thresholds are configurable by the system administrator. In another embodiment, the thresholds are defined by the storage device manufacturer. In yet another embodiment, the thresholds are configurable by the administrator, based on ranges of values enabled by the storage device manufacturer.

In one embodiment, the system utilizes weights that are assigned to the different resource-related processes in the systems. Each weight defines a priority for scheduling the corresponding process. In one embodiment, the higher the weight, the higher the priority given to the process, which results in a higher amount of allocated resources, such as allocated CPU cycles and disk IOs. More details about the use of weights for scheduling processes in the system are provided below with reference to FIGS. 3A-3C.

For description purposes, embodiments are presented herein with reference to a generic resource, named resource X, and embodiments presented may be applied to any of the resources being consumed in the storage device. Further, a processing task is defined as a process that increases resource utilization for resource X, and a generating task is a process that decreases the resource utilization of the resource in the system by freeing amounts of resource X. For example, the NVRAM drainer is an example of a generating task that increases the amount of NVRAM pages available. Other examples of generating tasks include garbage collection (GC), and index merge (which merges database indices to increase the amount of space available for indexing in the storage device).

In one embodiment, a first threshold T1 246 is defined for the resource utilization of resource X. When the resource utilization is below T1, the weight associated with scheduling the generating task is assigned a first value. The weight is also referred to herein as a priority weight because the weight is utilized to determine the priority of the generating task during scheduling. In one embodiment, the first value is a predetermined constant, which is the weight associated with the generating task when the system first boots up.

A second threshold T2 250 is further defined for the resource utilization of resource X, where threshold T2 is greater than threshold T1. When the resource utilization is between T1 and T2 (range 248), the system uses a variable value for the weight, which is referred to herein as dynamic weight adjustment. As the resource utilization grows, the weight is increased in order to allocate more cycles to the generating task because the resource utilization is starting to show congestion. More details are provided below with reference to FIGS. 4A-4B regarding the dynamic assignment of the value for the weight.

A third threshold T3 254 is further defined for the resource utilization of resource X, where threshold T3 is greater than threshold T2. When the resource utilization is greater than T2 and less than T3 (range 252), the system starts throttling IOs, that is, the system queues the IOs for a random amount of time and/or discards some IO requests. When the resource utilization is greater than T3 (range 256), the resource is under extreme congestion and the system suspends the processing of incoming IOs completely until the resource utilization becomes lower than T3.

A module called resource depressurizer 242 tracks the resource utilization and takes actions to assign weights to the different resource generating processes, as described above, based on the current value of the resource utilization and the values of the different thresholds.

FIG. 3A is a high level diagram of the hierarchical scheduler according to one embodiment. The storage array tasks 302 include foreground task 306 and background tasks 308. Foreground task 306 refers to the processing of IO requests 312.

The storage array may have a CPU with multiple cores (e.g., 2, 4, 8, 12, 16, 20, 24, 44 cores, etc.), and, in one embodiment, threads are created within each CPU core for processing requests. These threads are referred to herein as worker threads. For example, one thread may be created per CPU core, but multiple threads per CPU core are also possible. The threads are constantly running as long as there is work to do, i.e., a request needs to be processed.

Background tasks are tasks created in the storage system for general operations in the array. The background tasks may arise in response to certain events such as: consumption of a resource reaching a threshold, periodicity to ensure metadata consistency, a schedule to take a snapshot becoming ready, etc. In one embodiment, a fair CPU scheduler 304 fairly allocates CPU cycles to background tasks 308 and to foreground workloads 306. In order to ensure fairness between background tasks and foreground workloads, fair CPU scheduler 304 identifies tasks waiting to be executed and allocates resources to these tasks fairly.

Fairness means that any single background task or foreground IO processing cannot dominate CPU utilization. Additionally, any single foreground workload cannot dominate in getting Input/Outputs Per Second (IOPS) or throughput from the system. In one embodiment, fairness means proper assignment of resources in terms of data consumption, where the data consumption may be measured as megabytes accessed or megabytes per second (MBPS) delivered by the different workloads.

In one embodiment, if the system administrator of the storage array does not specify any performance parameters for any of the volumes, then the default scheduling mechanism is used to ensure equal access by all applications. However, if the system administrator configures performance guidelines for the different flows, the scheduler uses these configured parameters to allocate resources among the different foreground flows. The settings by the administrator therefore define what is believed fair, for the given implementation (e.g., types of applications running, importance of applications or data, etc.).

FIG. 3B is a detailed scheduling hierarchy, according to one embodiment. The scheduler knows about the relative importance of the tasks to be performed, including configured user parameters regarding priority/importance for allocation. The CPU scheduling system includes a hierarchy of schedulers that operate at different levels. It is a hierarchy of schedulers because the scheduling is done in several phases in an ordered way. The CPU scheduling system determines the order in which tasks are processed, i.e., assigned CPU time. Although the embodiments presented herein referred to the allocation of CPU, the same principles may be applied to the allocation of hard drive resources, or any other type of resources in the storage array.

In one embodiment, each scheduler operates on a schedulable entity, where schedulable entities are any IO request (for performing an IO request) or any work request (for performing a background task). Maintaining multiple levels of schedulers enables achieving fairness in multiple dimensions, e.g., foreground task versus background tasks, access to hard disk by different applications, etc. The objective of the hierarchy of schedulers is to select the most eligible IO or work request that is waiting for a resource (e.g., a queued task) and allocate the resource to the request.

In one example, there are two kinds of schedulers in the hierarchy: schedulers that select another scheduler, and schedulers that select a request to be allocated with CPU time. Fairness may be configured at every level and by all schedulers or at select levels or schedulers. The overall goals of the scheduling system are to obtain fairness among the different tasks in the storage array, and to provide controls to the user for assigning priorities to different tasks, and to flows of foreground flow processing.

At the root is the CPU scheduler, also referred to herein as the root scheduler 330. In some embodiments, there may be other schedulers above the root scheduler 330, which may then be designated as the root. However, in this example, the mission of the root scheduler 330 is to select a task for allocating CPU. In one embodiment, each task has its own scheduler, as discussed in more detail below with reference to FIG. 3C. Therefore, CPU scheduler 330 is a scheduler that selects another scheduler.

One goal of the root scheduler 330 is to ensure fairness between foreground and background tasks. For example, it would be unsatisfactory to have a background task using so much CPU that the foreground workloads would not obtain enough CPU to provide adequate performance. Similarly, it would be unsatisfactory to have too many user requests to starve the background tasks from CPU time.

When the root scheduler selects a task, the corresponding scheduler is invoked to select a request for assigning CPU time. Regarding foreground workloads, fairness means not having one volume consume too many resources so other volumes are starved for CPU. For example, if one flow increases its load temporarily, the increase should not have a major impact on the performance of other flows. The foreground flow scheduler 332 selects which flow is to be served next, i.e., which flow scheduler will be invoked next.

In one embodiment, the CPU scheduler 330 selects a task based on the amount of CPU cycles consumed over time by that task. For some types of requests, there is a fix overhead and a variable consumption of resources. For example, for a write request there is a fix amount of overhead regarding the processing the incoming request, writing the data to NVRAM, and sending the acknowledgment back to the initiator. Additionally, there is a variable component that depends on the size of the data to be written. This means compression of the data and writing the data to HDD.

For example, if one application is writing 4 Kb blocks and another application is writing 256 Kb blocks, when it comes to flushing the NVRAM to disk, the CPU utilization is directly proportional to the amount of data being sent to disk. In one embodiment, the foreground flow scheduler 332 selects which flow will be served next based on the amount of data previously consumed by that flow. In one embodiment, the amount of data consumed is measured in megabytes, and in another embodiment it is measured in megabytes per second.

Therefore, two different metrics are used at the first level and at the second level of the hierarchical scheduler. At the second level, data consumption is used as this is one of the key performance metrics for a storage system and for prioritizing the different foreground workloads. At the first level, data consumption does not make sense for background activities, therefore, the amount of CPU consumed is used for scheduling because it provides a good metric for balancing the foreground task with the background tasks. This dual criterion is referred to herein as a dual currency (e.g., CPU cycles, data consumed) for scheduling tasks. It is noted that in some embodiments, scheduling a request means assigning the request to be executed by a CPU thread.

Figure 3C:
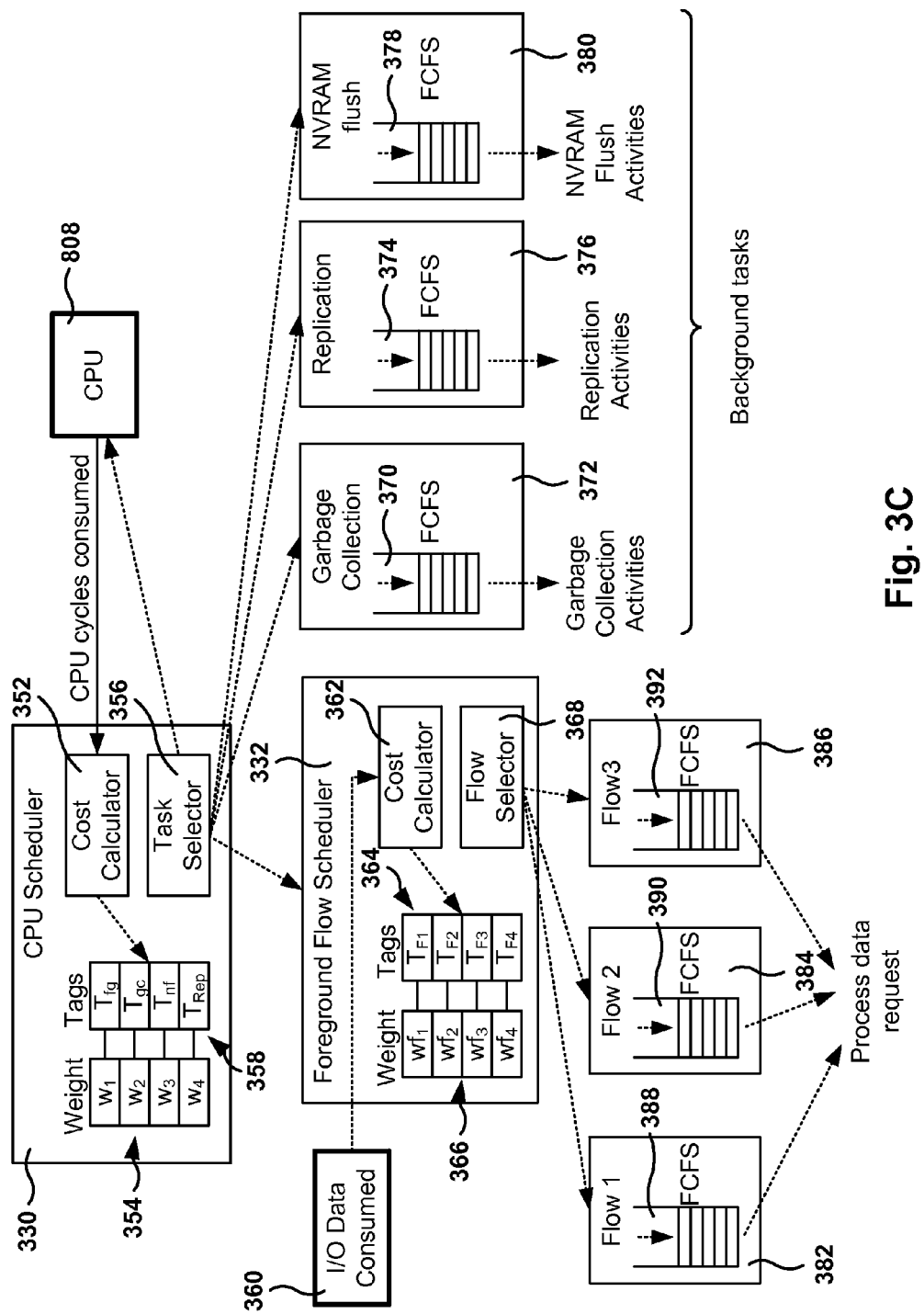
FIG. 3C illustrates a plurality of schedulers within the scheduling hierarchy, in accordance with one embodiment.

FIG. 3C illustrates a plurality of schedulers within the scheduling hierarchy, in accordance with one embodiment. In one embodiment, the root scheduler utilizes a Start-time Fair Queueing (SFQ) algorithm with CPU utilization as the cost metric. SFQ is a throughput allocation algorithm used for sharing a resource among multiple entities. For example, the different tasks in the storage array are the entities being selected by the CPU scheduler for the processing of their respective requests.

Whenever an entity uses the resource, the entity is charged with a cost. The charge is a function of the amount of resource consumed (e.g., CPU cycles) and a weight $w_i$ associated with the entity. In one embodiment, each entity has a queue and an accumulated charge, referred to herein as the tag, and when the scheduler is deciding which entity to schedule next, the active entity with the least accumulated charge is selected.

A queue is considered active, if the queue has at least one outstanding request to be processed. Otherwise the queue is idle. A tag is associated with every active queue for tracking the accumulated charge. When a queue from entity i becomes active from idle, the initial tag $t_i$ for the entity i is calculated as follows:

$$t_i = \max(t_i', \min(\text{tags for all active queues})) \quad (1)$$

Where $t_i'$ is the previous value of $t_i$. Basically, equation (1) is used to normalize the tag with respect to the active queues. This ensures that an active queue is not penalized for using bandwidth when other queues were idle and the system had excessive bandwidth, thereby accumulating a large tag value.

When it's time for the scheduler to select the next task, the active queue with the smallest tag $t_i$ is selected. The scheduled entity is then charged an amount $ch_i$ calculated as follows:

$$ch_i = \text{cost}(p)/w_i \quad (2)$$

Where cost(p) is the CPU cycles consumed by the selected task and $w_i$ is the weight of the selected entity i. The tag of the entity i is then updated with the charged amount as follows:

$$t_i = t_i' + ch_i \quad (3)$$

The weigh $w_i$ indicates the relative importance of each queue or entity. For example, for the same amount of CPU cycles consumed, a queue with a weight of 4 will be charged half than a queue with a weight of 2. If just two entities with the same weight are running, then both entities will get 50% of the CPU.

In one embodiment, it is desirable to give some head start to a queue that just turned active from idle. To achieve this, a delta value is subtracted to $t_1$ to a queue that just became active after a threshold period. Equation (1) is adjusted as follows:

$$t_i = \max(t_i', (\min(\text{tags for all active queues}) - \text{delta})) \quad (4)$$

The delta value represents a head start or advantage given to a queue that just became active. This delta value is also referred to as an idle boost. The delta value is configurable by the designer and can be changed over time based on the performance of the system and the desired level of idle boost to be given to new active tasks.

With reference to CPU scheduler 330, the CPU scheduler uses an SFQ algorithm with weights 354 for each of the tasks 358 in the first level of the hierarchical scheduler. The cost calculator 352 keeps track of charges and tags (e.g., $T_{fg}$, $T_{gc}$, $T_{nf}$, $T_{Rep}$), as described above with reference to equations (1)-(4). The Task Selection module 356 then determines which task is selected when it's time to select a new task, based on the tags 358 for all the active tasks.

As previously discussed, in one configuration, any task that is not in the latency path for foreground IO is a background task. The foreground flow scheduler 332 is given a weight $w_1$, and other background tasks are given respective weights (e.g., $w_2$, $w_3$, $w_4$, . . . ) (e.g., 4, 2, 2, 1). In one embodiment, based on the resource consumption in the system, the weights of certain background tasks may be modified dynamically.

In one embodiment, the foreground flow scheduler also utilizes an SFQ algorithm but the cost allocated to running entity is based on the amount of IO data consumed 360 by each of the flows 364 $F_1$, $F_2$, $F_3$, . . . The cost calculator 362 determines the cost allocated to each flow based on the amount of IO data consumed by that flow.

Therefore, there is a first level scheduler 330 utilizing a first currency for scheduling, the amount of CPU 208 consumed. At the second level, for scheduling flows, there is a second level scheduler 332 utilizing data consumed by an executed task.

Other schedulers, such as garbage collection 372, replication task 376, and NVRAM flush 380 utilize first-come first-served (FCFS) selection algorithms. Each of the schedulers included a queue 370, 374, 376 holding the tasks waiting for processing. To ensure fairness between foreground workloads, all IO requests belonging to a workload need to be identified and associated with a single logical identity, and then each such logical entity can be subjected to fair CPU scheduling. That logical entity is the flow. A flow maps to a LUN, or to a volume, or to a virtual volume.

In one embodiment, there are two possible configurations for a flow. First, multiple protocol connections per flow. An iSCSI single LUN per session/connection scenario, where protocol connections represent iSCSI sessions to a LUN from a host. Here, the flow represents a volume, and all requests for a volume, received on multiple protocol connections, belong to the same flow that represents the volume.

A second possible configuration includes multiple flows per single protocol connection. In a scale out forward connection scenario, a single forward connection can have IO requests from different hosts to different volumes, and a flow represents a volume. All requests for a volume, received on one or more forward connections, belong to the same flow that represents the volume. Further, a forward connection may carry requests belonging to different flows.

Cost calculator 362 of foreground flow scheduler 332 measures bytes generated (i.e., consumed) by each of the flows for read and write operations. The flow selection module 368 selects which of the active flow schedulers will be given the CPU next, using an SFQ algorithm as described above, but using data consumed as the cost metric instead of CPU cycles consumed. Once any of the flows are selected by the flow scheduler 332, the respective flow scheduler 382, 384, 386 is selected, and then the selected flow scheduler will select an IO request to be executed using an FCFS algorithm. Other embodiments may utilize other scheduling algorithms other than FCFS.

In one embodiment, three different ways of calculating cost may be used. First, a fixed upfront constant cost is assigned. This fixed cost is charged upfront when the entity is selected. Second, a variable upfront cost. When a schedulable entity is selected, its cost is known before its execution based on the type of entity. For example, the IO request size is used as the variable upfront cost for admitting the request. Third, a fixed upfront cost plus a deferred variable adjustment. When it is not possible to find out the true cost of a schedulable entity before its execution, the entity is charged a constant amount upfront. During execution, the actual cost is measured and any delta from the upfront cost is incorporated into the next scheduling cycle. The reason for the upfront constant cost is to avoid unfairness that may arise if no cost is incurred by the schedulable entity at the time of selection.

It is noted that the embodiments illustrated in FIG. 3C are exemplary. Other embodiments may utilize different types of schedulers (e.g., prioritized tasks within a flow), include other types of background tasks, etc. The embodiments illustrated in FIG. 3B should therefore not be interpreted to be exclusive or limiting, but rather exemplary or illustrative.

FIG. 3C illustrates the scheduling hierarchy for the CPU scheduler, but the same principles apply to the disk scheduler. For simplicity of description, the hierarchical disk scheduler is not described in detail, but the same principles presented herein regarding the CPU scheduler also are applied to the disk scheduler, including the use of a hierarchical scheduling structure, weights 366, tags 364, task queueing, task allocation, data consumption, etc. In one embodiment, the disk scheduler uses a single currency system (e.g., disk IO consumed).

Figure 3D:
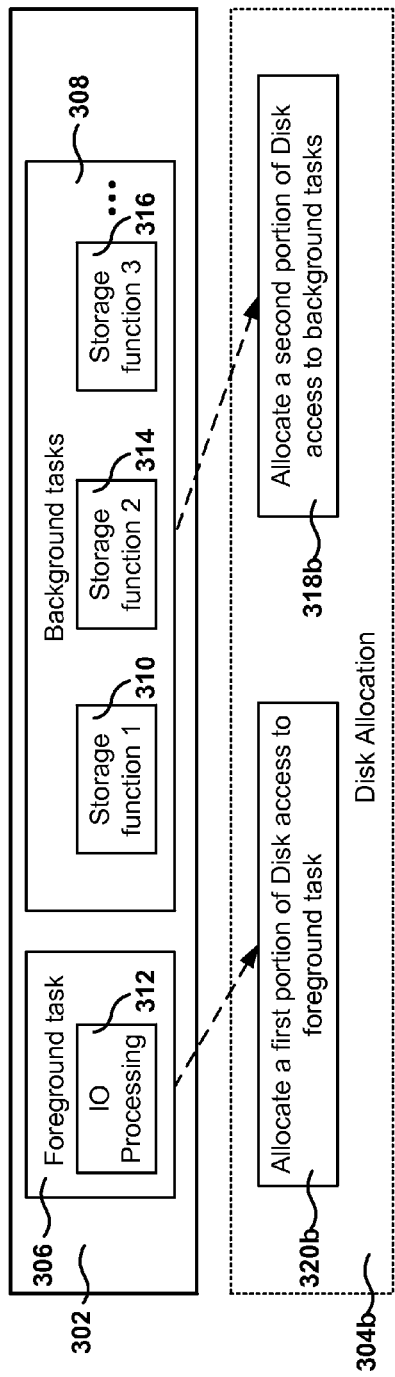
FIG. 3D is a high level diagram of the hierarchical disk scheduler according to one embodiment.

FIG. 3D is a high level diagram of the hierarchical disk scheduler according to one embodiment. In one embodiment, the storage array has multiple hard disk drives, multiple of them grouped together in to one RAID group. The storage array creates one RAID group per shelf of hard disk drives. Read IO requests are sent to one or more hard disk drives which contain the requested data in a RAID group, and write IO requests are sent to all disk drives in a RAID group. The hierarchical fair disk scheduler considers each read or write IO as a unit of consumption. In a system that has multiple RAID groups, the fair disk scheduler concurrently schedules IOs on RAID groups.

In one embodiment, a fair disk scheduler 304b fairly allocates disk IOs to background tasks 308 and to foreground workloads 306. In order to ensure fairness between background tasks and foreground workloads, fair disk scheduler 304b identifies tasks waiting for disk IOs and allocates disk IOs to these tasks fairly.

Fairness means that any single background task or foreground IO processing cannot dominate disk IO access. Additionally, any single foreground workload cannot dominate in getting Input/Outputs Per Second (IOPS) or throughput from the system.

Figure 3E:
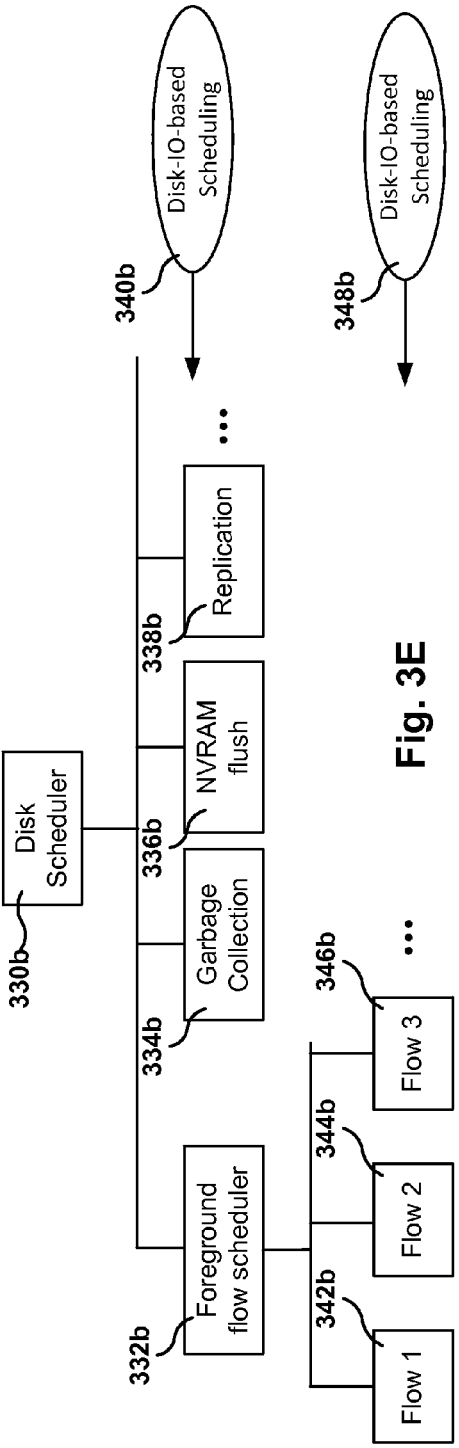
FIG. 3E is a detailed disk scheduling hierarchy, according to one embodiment.

FIG. 3E is a detailed disk scheduling hierarchy, according to one embodiment. The disk scheduler knows about the relative importance of the tasks to be performed, including configured user parameters regarding priority/importance for allocation. The disk scheduling system includes a hierarchy of schedulers that operate at different levels. The disk scheduling system determines the order in which tasks are processed, i.e., assigned disk IOs.

In one example, there are two kinds of schedulers in the hierarchy: schedulers that select another scheduler, and schedulers that select a request to be allocated disk IOs. Fairness may be configured at every level and by all schedulers or at select levels or schedulers. The overall goals of the scheduling system are to obtain fairness among the different tasks in the storage array, and to provide controls to the user for assigning priorities to different tasks, and to flows of foreground flow processing.

At the root is the disk scheduler 330b, also referred to herein as the root scheduler 330b. In some embodiments, there may be other schedulers above the root scheduler 330b, which may then be designated as the root. However, in this example, the mission of the root scheduler 330b is to select a task for allocating disk IOs. In one embodiment, each task has its own scheduler. Therefore, disk scheduler 330b is a scheduler that selects another scheduler.

One goal of the root scheduler 330b is to ensure fairness between foreground and background tasks. For example, it would be unsatisfactory to have a background task using so much disk IO that the foreground workloads would not obtain enough disk IO to provide adequate performance.

In one embodiment, the disk scheduler 330b selects a task based on the amount of disk IO consumed over time by that task. For example, if one application is writing 4 Kb blocks and another application is writing 256 Kb blocks, when it comes to flushing the NVRAM to disk, the disk utilization is directly proportional to the amount of data IOs being sent to disk. In one embodiment, the foreground flow scheduler 332b selects which flow will be served next based on the amount of data IO previously consumed by that flow. In one embodiment, the amount of data IO consumed is measured in megabytes, and in another embodiment it is measured in IOs per second.

Figure 4A:
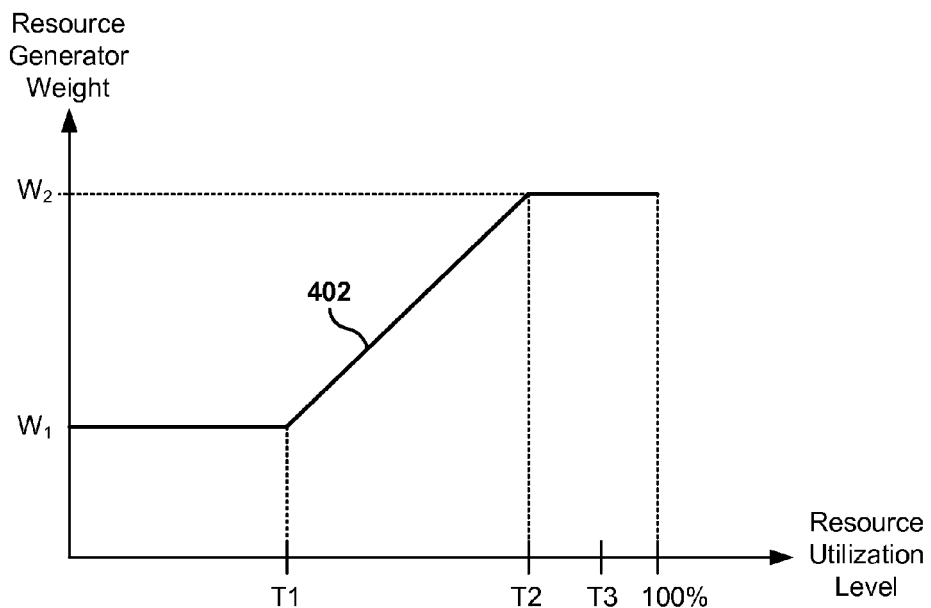
FIGS. 4A-4B illustrate dynamic weight adjustment, according to respective embodiments.
Figure 4B:
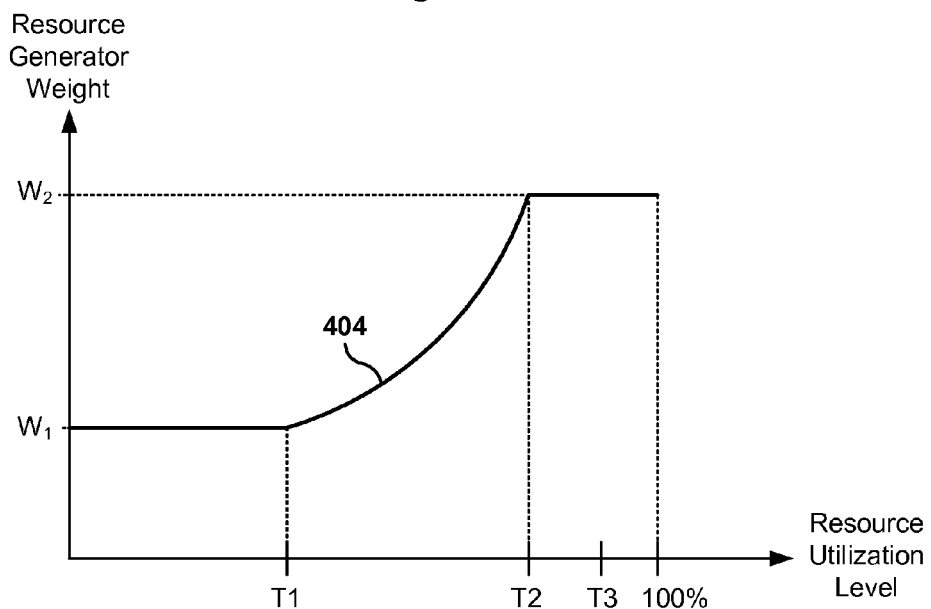

FIGS. 4A-4B illustrate dynamic weight adjustment, according to respective embodiments. FIG. 4A illustrates the dynamic adjustment of weight to the generating task 402, where the weight value grows linearly between threshold T1 and threshold T2, according to one embodiment.

When the resource utilization is less than threshold T1, the weight of the generating task is given a first value W1. Between threshold T1 and T2, the weight of the generating task is given a variable value that is a linear function directly related to the resource utilization value. At threshold T2, the weight of the generating task has a second value W2. Therefore, between threshold T1 and threshold T2, the assigned weight gradually and linearly increases with the resource utilization level, starting at W1 and ending at W2 for T2.

For values greater than threshold T2, the weight of the generating task is given the second value W2, that is, after T2 the weight does not increase with the resource utilization level.

Therefore, in this embodiment, W1 is a lower limit for the weight and W2 is an upper limit for the weight. The value W of the weight assignment function 402 can be defined as a function of the resource utilization U as follows:

$$W=W1, \text{ when } U \leq T1,$$

$$W=T1+(U-T1)/(T2-T1), \text{ when } T1 \leq U \leq T2,$$

$$W=T2, \text{ when } U \geq T2.$$

When there are plenty of resources available (i.e., U≤T1), foreground activities have high weights and background activities have low weights, which results in more resources allocated to foreground activities than to background activities.

When the resource utilization reaches threshold T1, the weight is gradually increased to increase the priority of background tasks. For example, for NVRAM, from T1 to T2 the weight for the NVRAM drainer is gradually increased. Similarly, if the resource under constraint is disk space, the weight of the garbage collection is increased to free disk space faster.

In a sense, it's like taking CPU cycles and disk IOs from foreground tasks to help background tasks free more resources faster. When the resource utilization reaches threshold T2, the highest possible weight is allocated so the background task can execute as often as possible. Resource utilization acts as a throttle to control depressurizing activities.

For example, in one embodiment foreground tasks are assigned a constant weight of 64, and the NVRAM drainer has weights between 4 (W1) and 128 (W2). Other embodiments may utilize different weights and different ranges, therefore, the embodiments illustrated in FIG. 4A should therefore not be interpreted to be exclusive or limiting, but rather exemplary or illustrative.

Each generating task associated with a resource is assigned its own weights to free the respective resource. There is a feedback loop, because as the resource utilization grows, the generating task gets more active (i.e., it's allocate a larger portion of the available CPU cycles), but if the resource utilization decreases, the generating task becomes less active.

FIG. 4B illustrates another weight assignment function. The weight assignment function may have other shapes, as long as it has a low weight value when the resource utilization is low and a higher weight value when the resource utilization grows. For example, FIG. 4B illustrates a weight assignment function 404 that starts an initial value of W1 and stays constant between 0 and T1 resource utilization.

From T1 to T2, the weight grows exponentially (e.g., quadratically) as the resource utilization grows, until it reaches a value of W2 at T2 utilization rate. Further, from T2, the weight stays constant until 100% utilization rate.

The function can have other shapes, for example linearly growing below T1 and above T2, and a step function between T1 and T2 where the weight grows in discrete amounts to be a growing stepwise function.

It is noted that the embodiments illustrated in FIGS. 4A-4B are exemplary. Other embodiments may utilize different weight values, different threshold values, utilize a larger number or a smaller number of threshold values to define the function, have functions that grow at different rates, etc. The embodiments illustrated in FIGS. 4A-4B should therefore not be interpreted to be exclusive or limiting, but rather exemplary or illustrative.

Figure 4C:
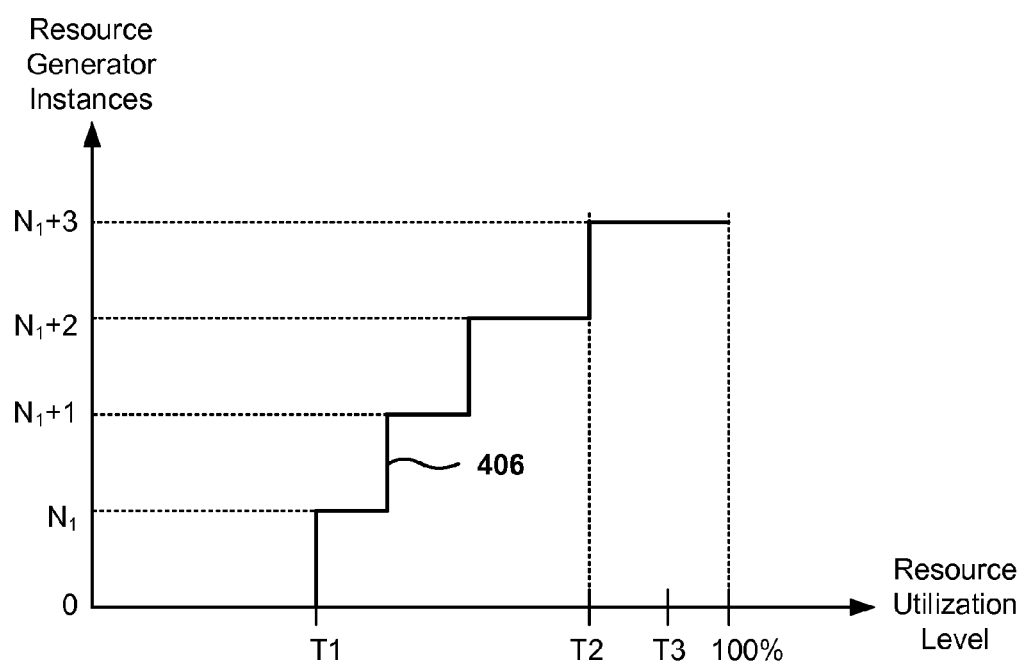
FIG. 4C illustrates the activation of additional instances of the resource-generator process, according to one embodiment.

FIG. 4C illustrates the activation of additional instances of the resource-generator process, according to one embodiment. In one embodiment, at any given time, there could be zero or more instances of the generating task for a given resource. In one embodiment, each CPU core may have an instance of the generating task executing at any time.

For example, initially there is no instance of the generating task. As the resource utilization grows, more instances of the generating task are started in each of the CPU cores available, until all cores are executing at least one instance of the generating task.

In one embodiment, the function 406 for determining how many instances of the generating task is determined by a step function based on the resource utilization level. In one embodiment, the system starts with no instances, and when the resource utilization reaches T1, a first instance is created, then when the resource utilization reaches another threshold value, another instance is created, and so on until the maximum number of instances is created in the system.

In one embodiment, the thresholds for allocating instances of the generating function are related to the thresholds for dynamic weight adjustment, but in other embodiments the functions are based on unrelated threshold parameters.

Therefore, in one embodiment, as the resource utilization grows, there are two measures being taken: dynamic adjustment of weights, and changing the number of active generating tasks.

It is noted that, in one embodiment, there is a different CPU scheduler for each core, and a disk scheduler for each RAID group. The CPU scheduler hierarchy is replicated for each RAID group, and there are several instances of the CPU scheduler, of the disk scheduler, etc.

Figure 5:
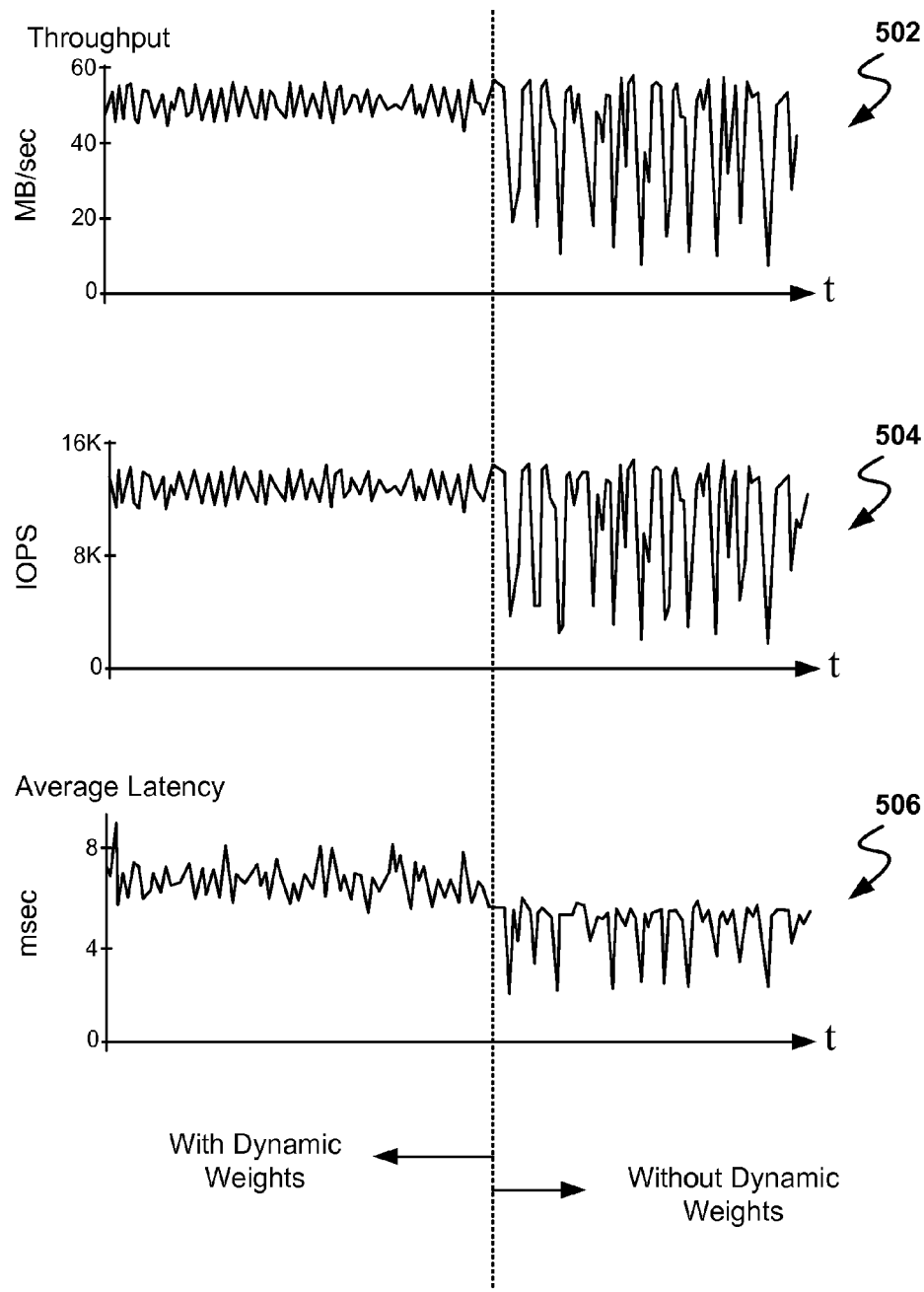
FIG. 5 illustrates some exemplary test results, according to one embodiment.

FIG. 5 illustrates some exemplary test results, according to one embodiment. FIG. 5 illustrates the result of testing for a continuous stream of write IOs, size 4 KB, being sent to the storage device.

On the left side of the charts, the tests show the results when dynamic weight adjustment is utilized, that is, when the weight associated with background tasks are dynamically adjusted as illustrated in FIG. 4A. The right sides of the charts illustrate the results when dynamic weight adjustment is not utilized, the system throttling IOs when resource utilization reaches a certain level.

Chart 502 shows the throughput of the system, and when dynamic weight adjustment is utilized, the throughput is very stable, oscillating between about 45 Mb and 55 Mb per second. However, when dynamic weight adjustment is turned off and only IO throttling is used, the throughput oscillates between a much wider range of values, approximately between 5 Mb and 55 Mb per second. A possible interpretation is that the system adjusts faster to lack of resources by increasing the background tasks weights, resulting in earlier positive action to respond to the increase in resource utilization.

Similarly, chart 504 shows that the IOs per second (IOPS) is also much more stable when dynamic weight adjustment is utilized. Further yet, the average latency of a write IO is more consistent when utilizing dynamic weight adjustment.

Figure 6:
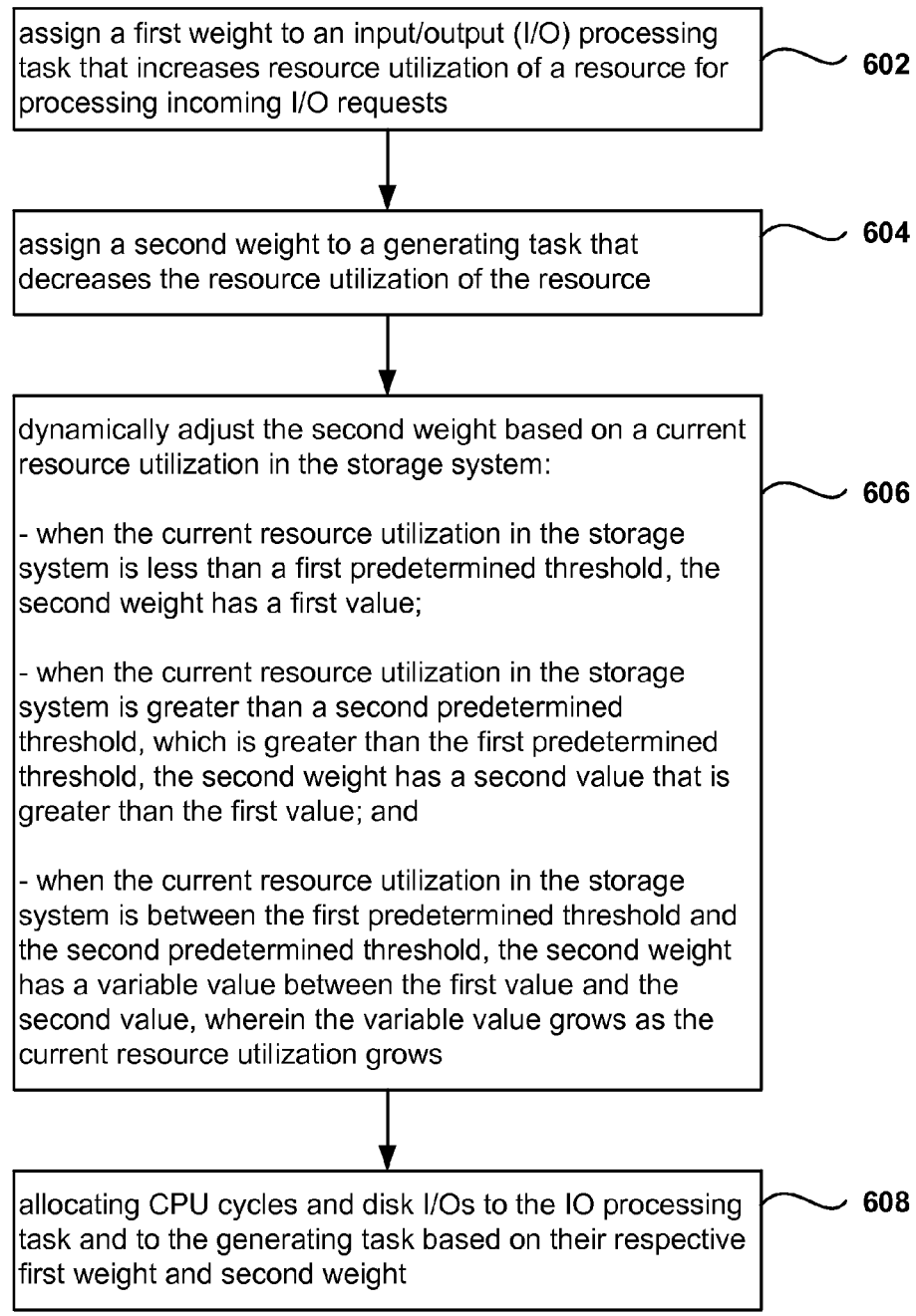
FIG. 6 is a flowchart of a method for allocating CPU (central processing unit) cycles and Disk IOs of a storage system, according to one embodiment.

FIG. 6 is a flowchart of a method for allocating CPU cycles and disk IOs (central processing unit) of a storage system, according to one embodiment. While the various operations in this flowchart are presented and described sequentially, one of ordinary skill will appreciate that some or all of the operations may be executed in a different order, be combined or omitted, or be executed in parallel.

In operation 602, a first priority weight is assigned to a processing task that increases resource utilization of a resource for processing incoming input/output (IO) requests. Further, in operation 604, a second priority weight is assigned to a generating task that decreases the resource utilization of the resource.

From operation 604, the method flows to operation 606 for dynamically adjusting the second weight based on the current resource utilization in the storage system. When the current resource utilization in the storage system is less than a first predetermined threshold, the second weight has a first value. When the current resource utilization in the storage system is greater than a second predetermined threshold, which is greater than the first predetermined threshold, the second weight has a second value that is greater than the first value.

Further, when the current resource utilization in the storage system is between the first predetermined threshold and the second predetermined threshold, the second weight has a variable value between the first value and the second value, wherein the variable value grows as the current resource utilization grows.

From operation 606, the method flows to operation 608 where the cycles of the CPU are allocated to the processing task and to the generating task based on their respective first weight and second weight.

Figure 7A:
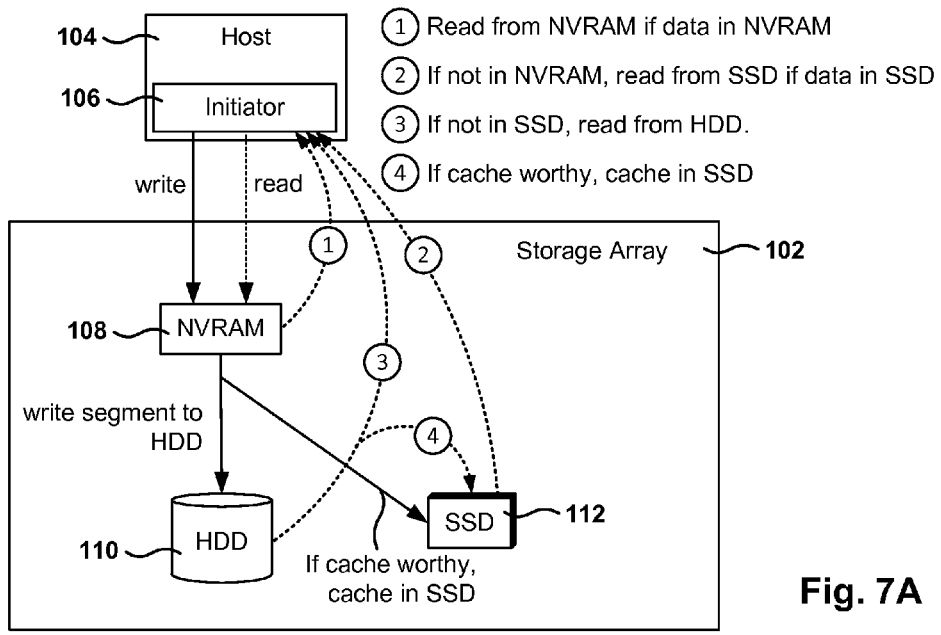
FIGS. 7A-7B illustrate the read and write paths within the storage array, according to several embodiments.
Figure 7B:
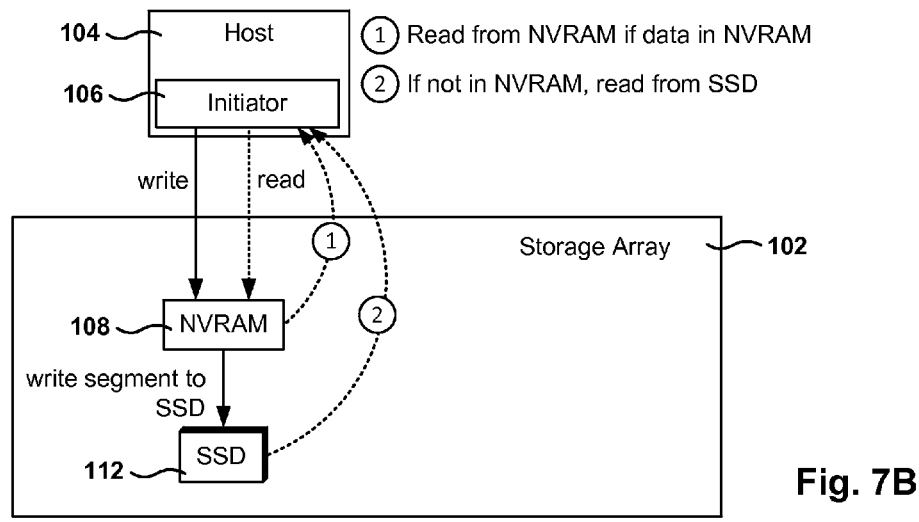

FIGS. 7A-7B illustrate the read and write paths within the storage array, according to several embodiments. FIG. 7A shows the write path for a hybrid system with SSDs and HDDs, where the initiator 106 in the host 104 sends the write request to the network storage device, also referred to herein as storage array 102. As the write data comes in, the write data is written into NVRAM 108, and an acknowledgment is sent back to the initiator (e.g., the host or application making the request). In one embodiment, storage array 102 supports variable block sizes. Data blocks in the NVRAM 108 are grouped together to form a segment that includes a plurality of data blocks, which may be of different sizes. The segment is compressed and then written to HDD 110. In addition, if the segment is considered to be cache-worthy (i.e., important enough to be cached or likely to be accessed again) the segment is also written to the solid state drive (SSD) cache 112. In one embodiment, the segment is written to the SSD 112 in parallel while writing the segment to HDD 110.

In one embodiment, the performance of the write path is driven by the flushing of NVRAM 108 to disk 110. With regards to the read path, the initiator 106 sends a read request to storage array 102. The requested data may be found in any of the different levels of storage mediums of the storage array 102. First, a check is made to see if the data is found in RAM (not shown), which is a shadow memory of NVRAM 108, and if the data is found in RAM then the data is read from RAM and sent back to the initiator 106. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 112 and sent to the initiator 106. If the data is not found in the NVRAM 108 nor in the flash cache 112, then the data is read from the hard drives 110 and sent to the initiator 106. In addition, if the data being served from hard disk 110 is cache worthy, then the data is also cached in the SSD cache 112.

FIG. 7B illustrates the read and write paths for an all-flash array having SSDs for permanent storage and no HDDs. The write path includes writing the incoming data to NVRAM 108 and later saving the data in SSD 112. The read path is also simplified as compared to the hybrid system of FIG. 7A, where the data is read from NVRAM 108 if available in NVRAM, and if the data is not found in NVRAM 108 then the data is read from SSD 112.

Figure 8:
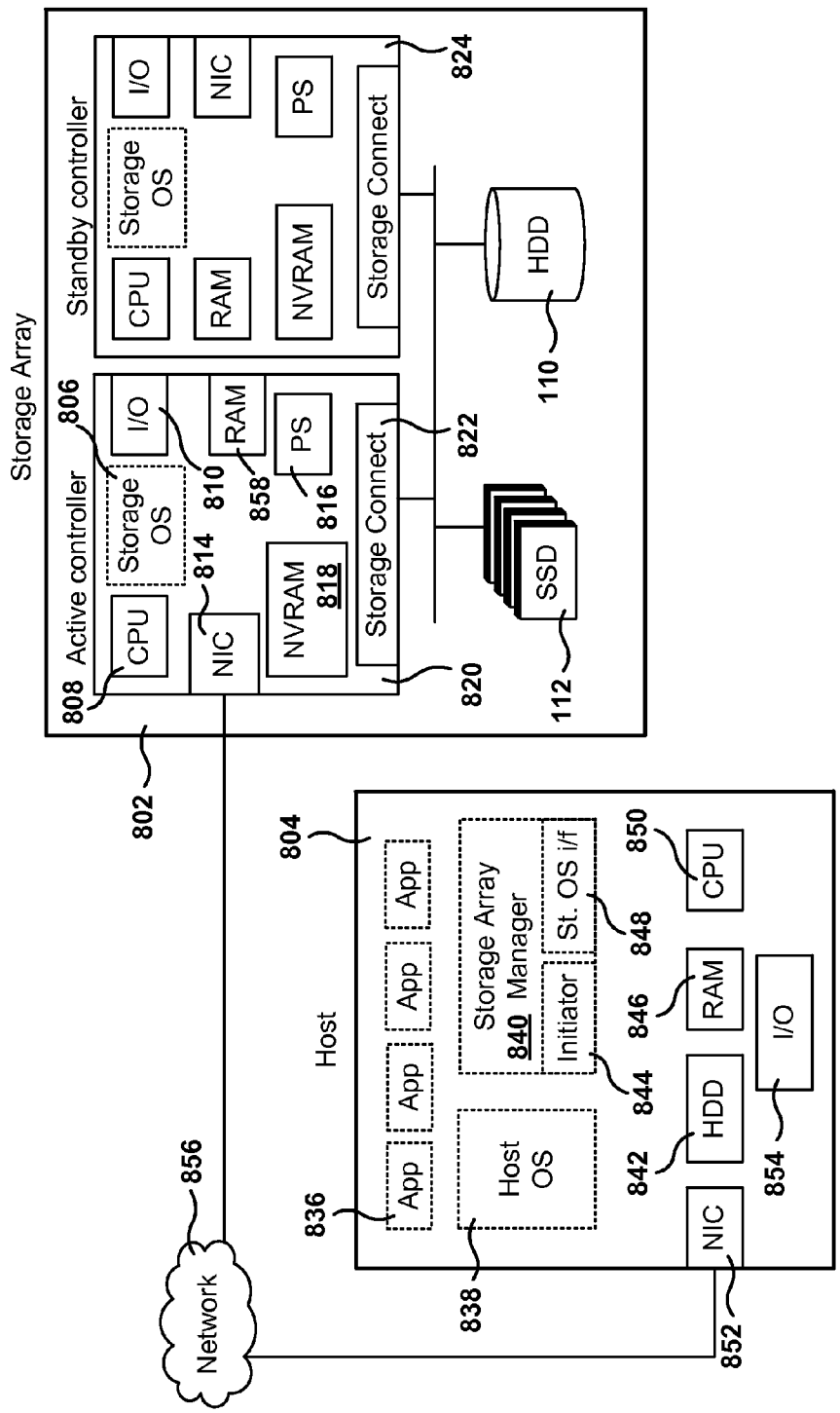
FIG. 8 illustrates the architecture of a storage array, according to one embodiment.

FIG. 8 illustrates the architecture of a storage array, according to one embodiment. In one embodiment, the storage array 802 includes an active controller 820, a standby controller 824, one or more SSDs 112, and disk storage 110. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to HDD 110 and optionally to SSD 112.

In addition, the active controller 820 further includes CPU 808, general-purpose RAM 858 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 112. In one embodiment, standby controller 824 includes the same components as active controller 820.

Active controller 820 is configured to execute one or more computer programs stored in RAM 858. One of the computer programs is the storage operating system (OS) used to perform operating system functions for the active controller device. In some implementations, one or more expansion shelves may be coupled to storage array 802 to increase storage capacity.

Active controller 820 and standby controller 824 have their own NVRAMs, but they share SSDs 112. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 112 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

One or more embodiments can also be fabricated as computer readable code on a non-transitory computer readable storage medium. The non-transitory computer readable storage medium is any non-transitory data storage device that can store data, which can be read later by a computer system. Examples of the non-transitory computer readable storage medium include hard drives, network attached storage (NAS), read-only memory, random-access memory, CD-ROMs, CD-Rs, CD-RWs, magnetic tapes, and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method for allocating CPU (central processing unit) cycles and disk IOs of a storage system, the method comprising:
    assigning a first weight to a processing task that increases resource utilization of a resource for processing incoming input/output (IO) requests;
    assigning a second weight to a generating task that decreases the resource utilization of the resource;
    dynamically adjusting the second weight based on a current resource utilization in the storage system, wherein,
    when the current resource utilization in the storage system is less than a first predetermined threshold, the second weight has a first value;
    when the current resource utilization in the storage system is greater than a second predetermined threshold, which is greater than the first predetermined threshold, the second weight has a second value that is greater than the first value; and
    when the current resource utilization in the storage system is between the first predetermined threshold and the second predetermined threshold, the second weight has a variable value between the first value and the second value, wherein the variable value grows as the current resource utilization grows; and
    allocating the CPU cycles and disk IOs to the processing task and to the generating task based on their respective first weight and second weight.

2. The method as recited in claim 1, wherein the variable value grows linearly from the first value to the second value when the resource utilization is between the first predetermined threshold and the second predetermined threshold.

3. The method as recited in claim 1, wherein the variable value grows exponentially from the first value to the second value when the resource utilization is between the first predetermined threshold and the second predetermined threshold.

4. The method as recited in claim 1, wherein the variable value grows in a step function from the first value to the second value when the resource utilization is between the first predetermined threshold and the second predetermined threshold.

5. The method as recited in claim 1, wherein the resource is non-volatile memory for storing the data of write IO requests, wherein the generating task increases an available amount of non-volatile memory by transferring data from the memory to permanent storage.

6. The method as recited in claim 1, wherein the resource is disk space for storing the data and meta data of a write IO request, wherein the generating task performs garbage collection to increase an available amount of disk space.

7. The method as recited in claim 1, wherein the resource is non-volatile memory for storing metadata for managing data of write IO requests, wherein the generating task increases an available amount of non-volatile memory for metadata by transferring data from the memory to permanent storage or by consolidating metadata information.

8. The method as recited in claim 1, further including:
throttling processing of the incoming IO requests when the current resource utilization is between the second predetermined threshold and a third predetermined threshold, the third predetermined threshold being greater than the second predetermined threshold.

9. The method as recited in claim 8, further including:
disabling processing of the incoming IO requests when the current resource utilization is greater than the third predetermined threshold.

10. The method as recited in claim 1, further including:
adding a new instance of the generating task when current resource utilization is greater than a fourth predetermined threshold.

11. A storage system comprising:
a non-volatile memory (NVRAM) for storing incoming input/output (IO) requests;
a hard drive (HDD) for permanent data storage; and
a central processing unit (CPU), wherein a processing task and a generating task are executed by the CPU, the processing task increasing resource utilization of a resource for processing incoming input/output (IO) requests, the generating task decreasing the resource utilization of the resource, wherein a CPU scheduler and a disk scheduler assign a first priority weight to the processing task-and a second weight to the generating task;
wherein the CPU scheduler and the disk scheduler dynamically adjust the second weight based on a current resource utilization in the storage system, wherein,
when the current resource utilization in the storage system is less than a first predetermined threshold, the second weight has a first value;
when the current resource utilization in the storage system is greater than a second predetermined threshold, which is greater than the first predetermined threshold, the second weight has a second value that is greater than the first value; and
when the current resource utilization in the storage system is between the first predetermined threshold and the second predetermined threshold, the second weight has a variable value between the first value and the second value, wherein the variable value grows as the current resource utilization grows;
wherein the CPU scheduler and the disk scheduler allocate CPU cycles and disk IOs to the processing task and to the generating task based on their respective first weight and second weight.

12. The storage system as recited in claim 11, wherein the variable value grows linearly from the first value to the second value when the resource utilization is between the first predetermined threshold and the second predetermined threshold.

13. The storage system as recited in claim 11, wherein the variable value grows exponentially from the first value to the second value when the resource utilization is between the first predetermined threshold and the second predetermined threshold.

14. The storage system as recited in claim 11, wherein the variable value grows in a step function from the first value to the second value when the resource utilization is between the first predetermined threshold and the second predetermined threshold.

15. The storage system as recited in claim 11, wherein the resource is the NVRAM, wherein the generating task increases an available amount of NVRAM by transferring data from the NVRAM to permanent storage.

16. The storage system as recited in claim 11, wherein the resource is HDD space, wherein the generating task performs garbage collection to increase an available amount of HDD space.

17. The storage system as recited in claim 11, wherein the storage array throttles processing of the incoming TO requests when the current resource utilization is between the second predetermined threshold and a third predetermined threshold, the third predetermined threshold being greater than the second predetermined threshold.

18. The storage system as recited in claim 17, wherein the storage array disables processing of the incoming IO requests when the current resource utilization is greater than the third predetermined threshold.

19. A non-transitory computer-readable storage medium storing a computer program for allocating CPU (central processing unit) cycles and disk IOs of a storage system, the computer-readable storage medium comprising:
program instructions for assigning a first weight to a processing task that increases resource utilization of a resource for processing incoming input/output (IO) requests;
program instructions for assigning a second weight to a generating task that decreases the resource utilization of the resource;
program instructions for dynamically adjusting the second weight based on a current resource utilization in the storage system, wherein,
when the current resource utilization in the storage system is less than a first predetermined threshold, the second weight has a first value;
when the current resource utilization in the storage system is greater than a second predetermined threshold, which is greater than the first predetermined threshold, the second weight has a second value that is greater than the first value; and
when the current resource utilization in the storage system is between the first predetermined threshold and the second predetermined threshold, the second weight has a variable value between the first value and the second value, wherein the variable value grows as the current resource utilization grows; and
program instructions for allocating the CPU cycles and disk IOs to the processing task and to the generating task based on their respective first weight and second weight.

20. The storage medium as recited in claim 19, wherein the variable value grows linearly from the first value to the second value when the resource utilization is between the first predetermined threshold and the second predetermined threshold.

21. The storage medium as recited in claim 19, wherein the variable value grows exponentially from the first value to the second value when the resource utilization is between the first predetermined threshold and the second predetermined threshold.

\* \* \* \* \*